3,404,199
HEATING PROCESS IN A ROTARY KILN
Friedrich Hoffmann, Wulfrath, Germany, assignor to Rheinische Kalkstein-Werke G.m.b.H., Wulfrath, Germany
Filed Sept. 26, 1966, Ser. No. 582,064
Claims priority, application Germany, Oct. 1, 1965, R 41,662
5 Claims. (Cl. 263—52)

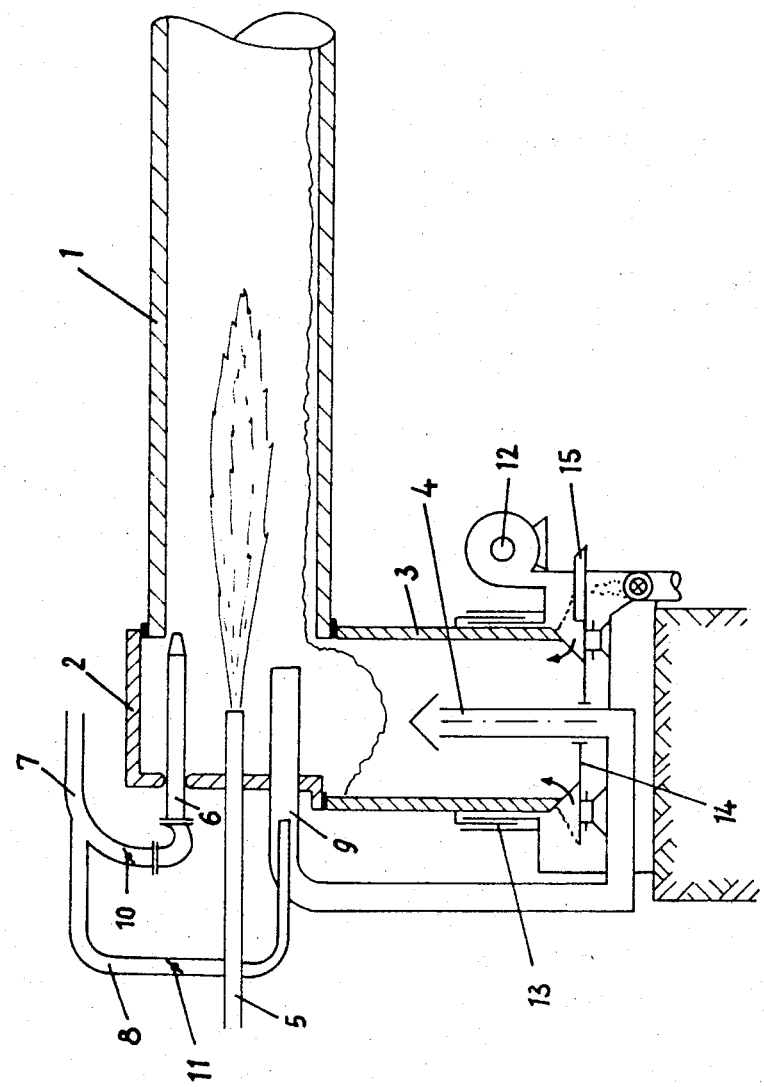

ABSTRACT OF THE DISCLOSURE

In the calcination of refractories in a rotary kiln, two secondary air flows are blown into the kiln separately and spaced from the flame; one of said flows is heated in the cooler to a temperature which is less than 200° C. below the temperature of the charge leaving the kiln and injected between the flame and the charge, and the other of said flows is less hot and injected between the flame and the upper wall of the kiln.

---

This invention relates to a process for the calcination or sintering of lime, dolomite, magnesite, cement, and similar materials.

For such calcination and sintering processes in rotary kilns it is known to introduce into the kiln heated secondary air in order to improve the heat balance; it is also known to heat part of such secondary air in a cooler arranged, in the direction of the flow of the material, behind the kiln, and to heat another part otherwise, e.g., in a regenerator or recuperator. In this way, the sensible heat of the calcined material as well as that of the waste gases is used for the firing process.

When utilizing the sensible heat of the material discharged from the kiln, it is possible to produce very hot secondary air, provided that only little air is heated. In the operation of a rotary kiln, however, the necessary amount of secondary air is determined by the type of the material to be fired or by the required heat energy; therefore, when a large amount of air is required, it is either necessary to heat in the cooler larger quantities of air, which results in lower temperatures, or to admix additional recuperator air. Thereby, a mean secondary air temperature is obtained. In this way, the heat balance is improved and a hotter flame is produced than with sole utilization of the heat of the discharged material; however, the hotter flame subjects the furnace lining and also the mouth of the kiln to higher stresses.

It is also known to render the flame hotter only at the side towards the sinter material by injecting oxygen into the space between flame and sinter material; in this way, not only a better radiation in the sinter material is obtained but also the opposite parts of the kiln are protected. However, the use of xoygen is expensive and requires special safety provisions.

It is a principal object of this invention to provide a calcination and sintering process which makes it possible, without the use of oxygen or oxygen enriched air, to raise the flame temperature at the side of the kiln facing the material to be fired, while protecting the upper parts of the kiln.

Other objects and advantages will be apparent from a consideration of the specification and claims.

According to the invention, the secondary air is heated in the shaft cooler to a temperature which is less than 200° C. below the temperature of the fired material falling from the kiln, and introduced into the space between the flame of the burner and the material to be fired, and, in addition, secondary air otherwise heated to a lower temperature is blown into the space above the flame.

Thereby, it is of advantage to use part of the secondary air of lower temperature as injecting medium for the hot secondary air from the shaft cooler. For this purpose, air may be passed into the regenerator or recuperator under pressure, and at the point of admission of said secondary air, which is heated to about 700 to 900° C., into the kiln mouth, a throttling member may be provided, whereby the required portion of the secondary air is introduced in front of the throttle; a further throttling member may be provided in said branch line.

The injector-like introduction of the hot secondary air from the shaft cooler produces in the area from which said air is taken and which is surrounded by hot sintered material, a negative pressure which prevents the air introduced into the shaft cooler from escaping through the cooler shaft into the kiln. Thereby, a current-free zone is produced in the upper part of the shaft cooler which provides for an after-sintering or after-deacidification of the material. Preferably, the air to be heated is forced by a blower under pressure into the shaft cooler.

From the shaft cooler, the hot secondary air is preferably drawn off through centrally mounted fixtures of heat-resistant material. Said drawing-off means should be arranged centrally particularly when the cooler is rotatable. This arrangement is of advantage to obtain a uniformly high temperature of the secondary air.

The temperature of the secondary air from the shaft cooler is controlled by the reduced pressure resulting from the injector effect and by the elevated pressure of the blower for the fresh air so as to be less than 200° C. lower than the temperature of the material falling into the cooler.

In addition to the recited advantages, it may be mentioned that the method of the invention prevents the obnoxious backflow of burnt gases in the direction towards the mouth of the kiln and therewith a lowering of the flame temperature in the lower flame zone. In addition, the introduction of secondary air from the regenerator or recuperator into the upper part of the kiln mouth through one or more pipes at the outlets produces a high air velocity parallel to the axis of the kiln, and resulting therefrom, reduced pressure. In this way, the outflow of hot air from the upper kiln part can be prevented, which without this arrangement might take place due to the uplift.

In the accompanying drawing, a sectional view of an apparatus suitable for carrying out the invention is diagrammatically shown.

A rotary kiln 1 opens into the mouth 2. Below said mouth, there is arranged a rotatable shaft cooler 3 which contains a central fixture 4 for drawing off heated secondary air. Above the burner 5, there is provided in the kiln mouth a swingable pipe 6 to introduce hot recuperator air which is supplied through line 7. Said line 7 has a branch line 8 through which the hot recuperator air is fed injector-like into the pipe 9 which projects into the kiln mouth below the burner. Throttle means 10 and 11 are disposed in the pipes 7 and 8 to control the recuperator air flow.

The secondary air to be heated in the shaft cooler is introduced by the blower 12 under elevated pressure. 13 are the conventional labyrinth packings of the rotatable shaft. The calcined or sintered material is removed from the dish-shaped bottom 14 of the shaft cooler by means of the scraper 15.

I claim:
1. In the process of calcinating or sintering material in a rotary kiln in counter-current to flame gases with introduction of secondary hot air into the mouth of the kiln and discharging the heated material from said kiln into a shaft cooler, the improvement which consists of heating a first part of said secondary air in said shaft cooler to a temperature which is less than 200° C. below the temperature of said discharged material falling through said shaft cooler, passing said part into the kiln separately and spaced from said flame gases in the space between flame and material, and passing a second part of said secondary air otherwise heated and having a temperature below the temperature of said first part also separately and spaced from said flame gases into the space above the flame.

2. The process as claimed in claim 1 comprising using a portion of said second part of said secondary air for the injector-like introduction of said first part of the secondary air into the kiln.

3. The process as claimed in claim 1 wherein the air to be heated in the shaft cooler is introduced thereinto under elevated pressure.

4. The process as claimed in claim 1 wherein said secondary air heated in the shaft cooler is withdrawn from the center of the cooler.

5. The process as claimed in claim 1 comprising blowing said second part of the secondary air into the upper part of the kiln mouth parallelly to the axis of the kiln.

References Cited
UNITED STATES PATENTS

| | | | |
|---|---|---|---|
| 2,555,289 | 5/1951 | Nagel | 263—32 |
| 2,653,809 | 9/1963 | Azbe | 263—32 |
| 2,965,366 | 12/1960 | O'Mara et al. | 263—32 |
| 2,970,828 | 2/1961 | Niems | 263—32 |
| 3,074,707 | 1/1963 | Humphries et al. | 263—33 |

JOHN J. CAMBY, *Acting Primary Examiner.*